Figure 1:
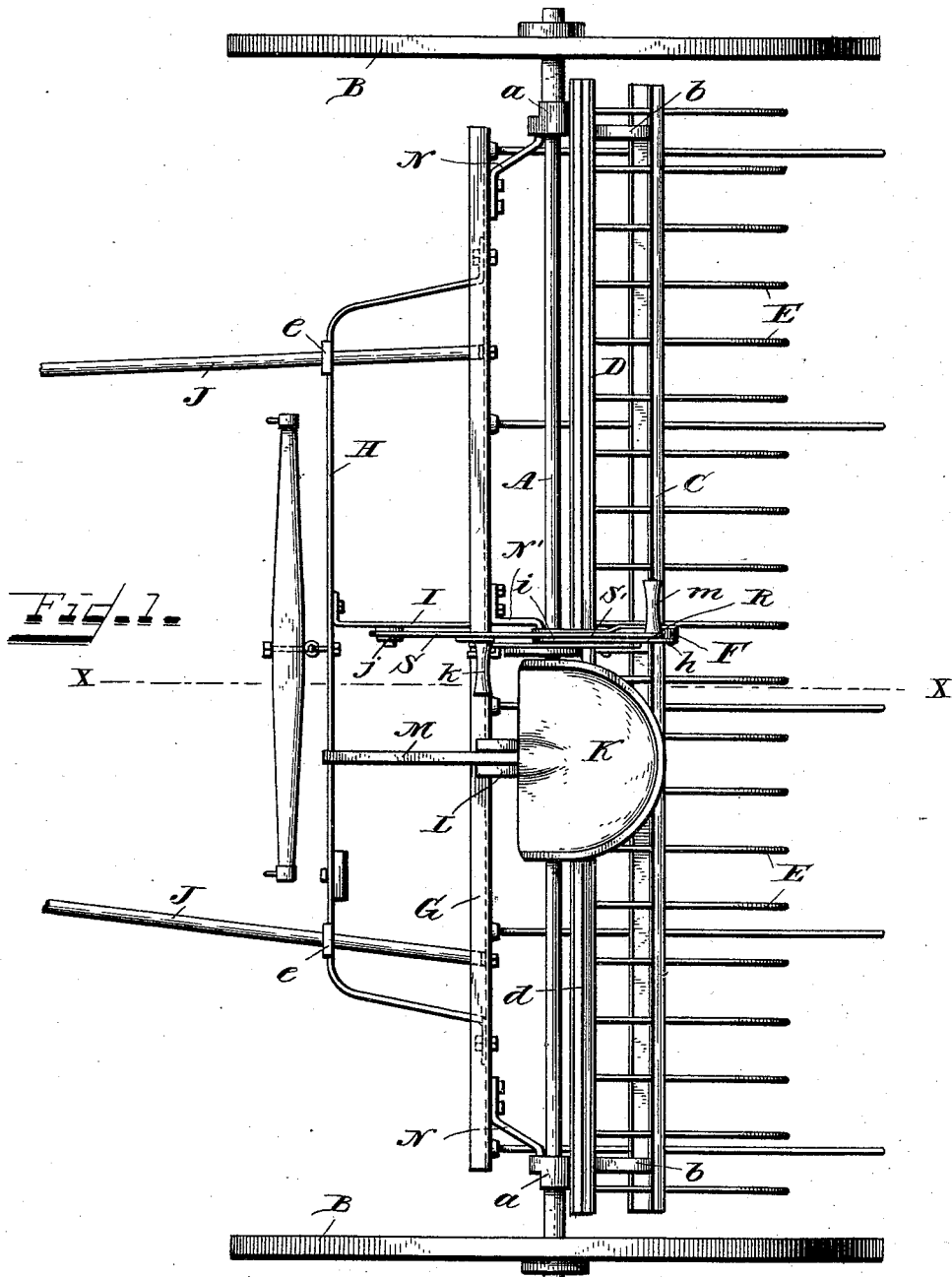

(No Model.) 4 Sheets—Sheet 1.

A. F. BROWN & W. R. KNAUB.
HORSE HAY RAKE.

No. 478,083. Patented July 5, 1892.

Witnesses.
J. Thomson Cross
E. W. Hardinghaus

Inventors.
Arthur F. Brown
William R. Knaub
by Peck & Rector
their Attorneys.

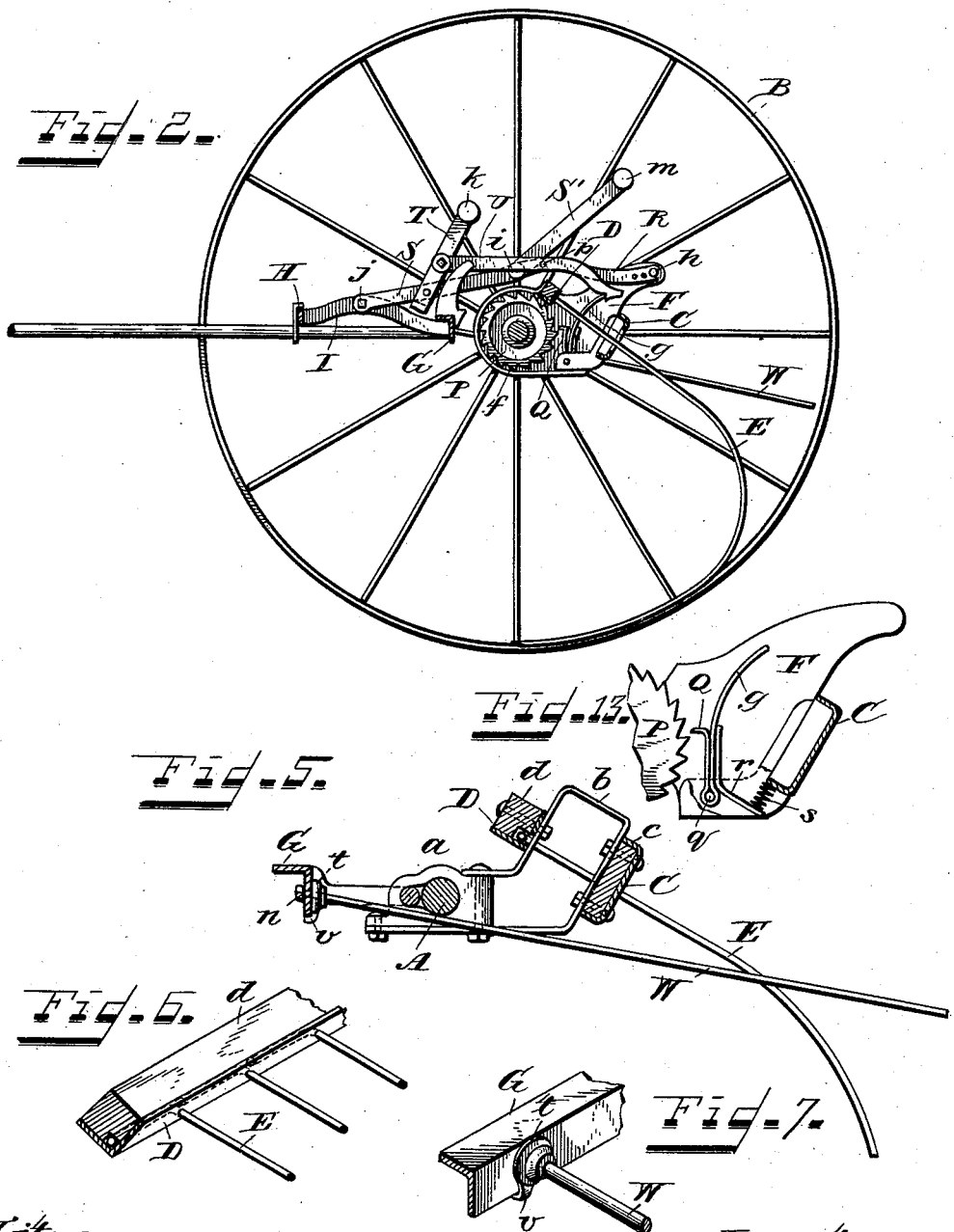

(No Model.) 4 Sheets—Sheet 3.
A. F. BROWN & W. R. KNAUB.
HORSE HAY RAKE.
No. 478,083. Patented July 5, 1892.
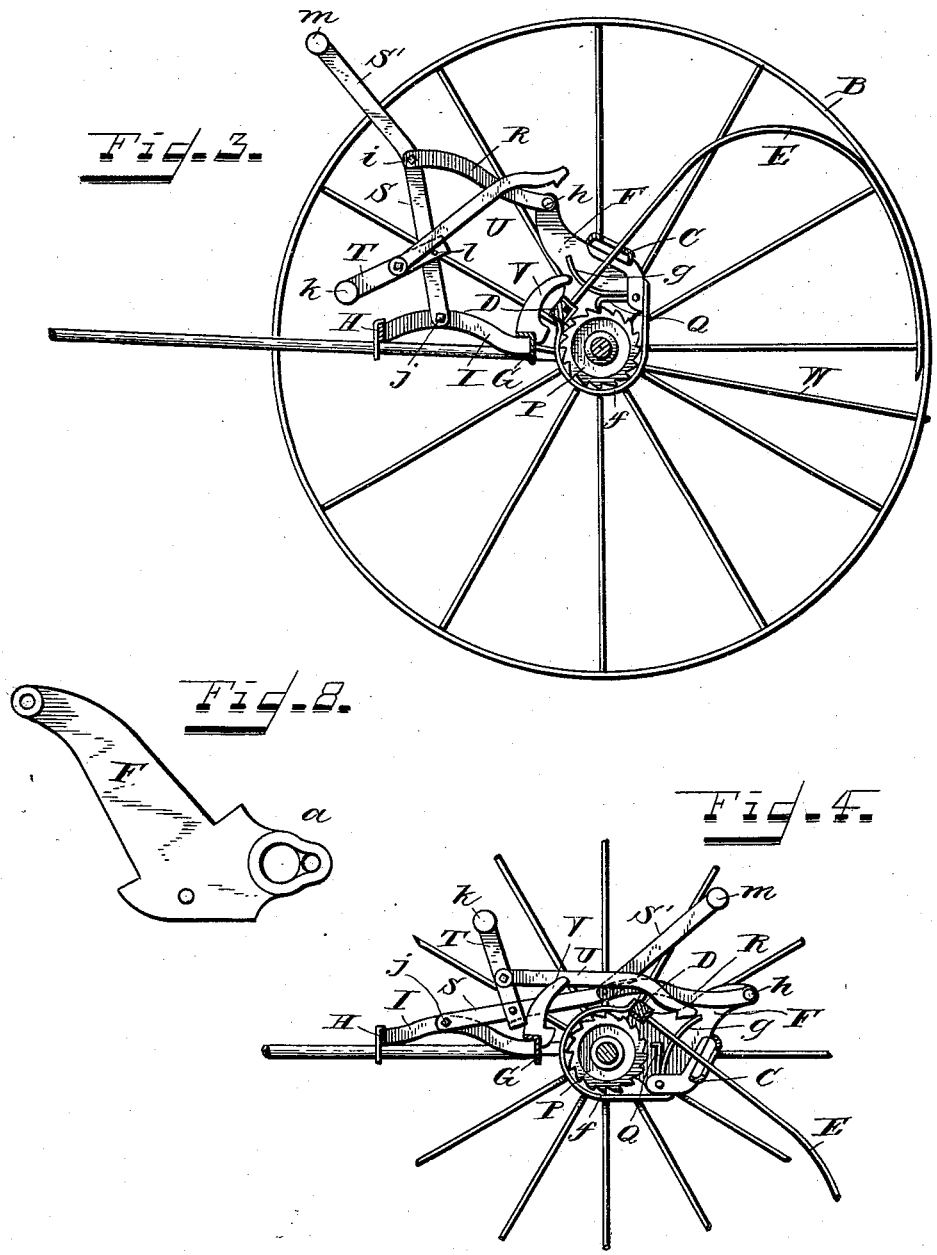

(No Model.) 4 Sheets—Sheet 4.
A. F. BROWN & W. R. KNAUB.
HORSE HAY RAKE.
No. 478,083. Patented July 5, 1892.
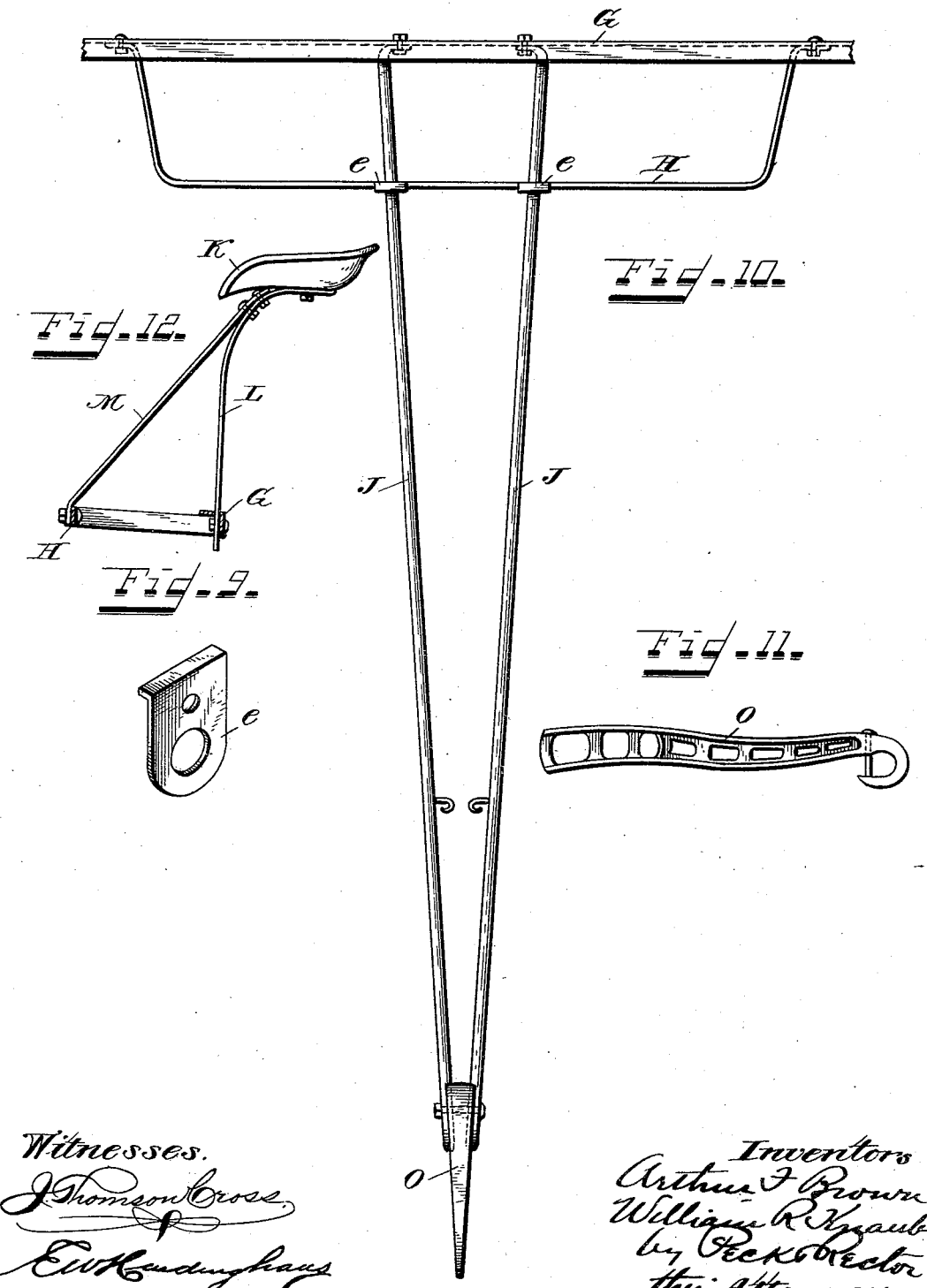

UNITED STATES PATENT OFFICE.

ARTHUR F. BROWN AND WILLIAM R. KNAUB, OF DAYTON, OHIO, ASSIGNORS TO THE STODDARD MANUFACTURING COMPANY, OF SAME PLACE.

HORSE HAY-RAKE.

SPECIFICATION forming part of Letters Patent No. 478,083, dated July 5, 1892.

Application filed January 25, 1892. Serial No. 419,137. (No model.)

*To all whom it may concern:*

Be it known that we, ARTHUR F. BROWN and WILLIAM R. KNAUB, citizens of the United States, residing at Dayton, in the county of Montgomery and State of Ohio, have jointly invented certain new and useful Improvements in Horse Hay-Rakes, of which the following is a full, clear, and exact description, reference being had to the accompanying drawings, forming part of this specification.

Our invention relates in part to all horse hay-rakes, and in part to that class of horse hay-rakes known as "self-dump" rakes, in which the traction of the machine is employed at the will of the operator to elevate the teeth and discharge the collected loads.

It has for its object the improved construction of horse hay-rakes, whereby their efficiency and simplicity of construction are increased.

The novelty of our invention will be hereinafter specified, and specially pointed out in the claims.

In the accompanying drawings, Figure 1, Sheet 1, is a plan view of a rake embodying our invention. Fig. 2, Sheet 2, is a sectional side elevation of the same through the dotted line $x$ $x$ of Fig. 1, looking to the right from the rear, and with the lever mechanism in position to effect the locking of the rake-head to the lifting-wheel of the revolving axle. Fig. 3, Sheet 3, is a corresponding view with the rake head and teeth lifted nearly to the point of release. Fig. 4, Sheet 3, is a corresponding broken detail showing the normal position of the lever mechanism just as the teeth have returned to work. Fig. 5, Sheet 2, is an enlarged sectional elevation at one end of the rake-head. Fig. 6, Sheet 2, is a detail perspective of a part of the tooth-bar. Fig. 7, Sheet 2, is a detail perspective of a portion of the stripper-bar. Fig. 8, Sheet 3, is an enlarged elevation of the rake-head lifting-plate. Fig. 9, Sheet 4, is an enlarged perspective of one of the thill-clips. Fig. 10, Sheet 4, is a plan view of the seat-frame, showing the manner of converting the thills into a pole for two horses. Fig. 11, Sheet 4, is an enlarged side elevation of the neck-yoke extension. Fig. 12, Sheet 4, is a side elevation, in detail, showing the seat-supports and connections. Fig. 13, Sheet 2, is a detail elevation of the locking-dog and connected parts.

The same letters of reference are used to indicate identical parts in all the figures.

The first part of our invention relates to the construction of the rake irrespective of the means for dumping the same, whether by hand or by the traction of the machine.

In this feature the invention consists in constructing the rake entirely of metal in the manner to be presently pointed out, thereby rendering its construction cheaper than wood in it present and increasing scarcity, and at the same time making it lighter and more durable. To this end we employ a cylindrical metal axle A, upon which are secured the metal supporting-wheels B and upon which the rake-head is hung and oscillates. The rake-head is composed of two end boxes $a$, Figs. 1 and 5, journaled upon the axle near the inner sides of the wheels B and having bolted thereto and projecting from the rear sides the metal strap-frame $b$. Bolted to these strap-frames on the rear side and extending across the rake parallel with the axle is a vertically-slotted metal bar C, having its upper and lower edges flanged, as seen at $c$, Fig. 5, to afford stiffness and enable light metal to be employed. Bolted to the forward sides of the strap-frames $b$ and extending across the rake parallel with the axle is a metal angle-bar D, having perforations through its rear side, through which the teeth E, of the usual construction, pass, as well as through the vertical slots in the bar C, and are held by right-angular bends upon their upper ends and secured in place by any suitable covering piece $d$, bolted to the bar D and recessed on its under side to receive the bent ends of the teeth, as shown in Fig. 6. The teeth have their usual limited vertical play in the slots of the bar C. At or near the middle of the rake-head a lifting-plate F, Fig. 8, of any suitable construction, is journaled upon the axle and has the bars C D bolted to it to serve in stiffening the rake-head and to afford a connection for any of the well-known lifting devices, as well as for that which will be hereinafter described.

The draft-frame for the rake so far described is constructed as follows: Slightly in front of and parallel with the axle is the draft metal angle-bar G, to which is bolted on its forward side the flat metal brace-bar H, of the shape shown in Fig. 1. These two bars are connected at or near their middle by a flat metal bar I. The thills J are made of light tubular metal and are inserted through clips e, Fig. 9, bolted to the bar H, and have their rear ends flattened and bent, as seen in Fig. 10, and bolted to the bar G. The driver's seat K is carried upon an upwardly-extending metal bar L, inserted through a slot in and bolted to the bar G, and is braced by the strap-bar M, extending from the bar H, Fig. 12. The seat and draft-frame thus constructed is connected to the rake-head as follows: Two metal journal-arms N, bolted to the bar G near each end, extend back and have the spindles upon their rear ends journaled in forward extensions of the boxes a, Fig. 5. A similar journal-arm N' at the middle extends back and is similarly journaled in the lifting-plate F. By this manner of hinging the draft-frame to the rake-head the weight of said frame and of the driver aids in tilting the rake-head to discharge the collected loads, as will be readily understood.

We are aware that metal axles and wheels are old in horse-rakes; but by constructing the rake as above described its durability and lightness are increased with a diminution in cost as compared with rakes having wooden draft-frames and rake-heads.

To convert a rake of this character from thills to a pole, it is only necessary to unbolt the rear ends of the thills and the clips e and to shift both to the position shown in Fig. 10 and rebolt them through holes in the bars H and G provided for that purpose and then to insert between the forward ends of the thills the cast neck-yoke extension-piece O, Fig. 11, which is secured in place by one or more bolts or clips. The sides of the piece O are concaved and shaped to receive the forward ends of the thills.

The next feature of our invention relates to the holding-down and dumping mechanism, and while shown as applied to the rake above described it is equally applicable to rakes of other construction, whether of wood or metal. In all cases the axle A is to revolve when the rake advances and preferably when it is turning in either direction, and to that end the axle is connected to the wheels B by ratchet-and-pawl connections in the hubs, as usual in this class of rakes. By the side of the lifting-plate F is secured upon the axle a lifting ratchet-wheel P, around which and secured to the plate F may be a partial housing f. Pivoted to the side of the plate F, near its bottom and in rear of the axle, is a dog Q, Fig. 13, adapted to be engaged with the ratchet to lock the rake-head to the axle. This dog has an upwardly-extending arm g and a lower and rearwardly-extending arm r, between which and the bar C is confined a spring s, which normally holds the dog out of engagement with the lifting-wheel. Pivoted at h to the plate F at its upper rear end is an arm R, whose forward end is pivoted at i to another arm S, pivoted at j at its forward end to the cross-bar I. It will be noticed that the pivot i is always above a straight line between the pivots h j, so that a toggle-lock cannot be effected to hold the rake-head locked down. This is effected by any suitable stop, as a pin p, Fig. 2, applied to the arm R, and with which the arm S' engages. Pivoted to the arm S between the pivots i j is an upwardly-extending pedal-arm T, having a laterally-extending pedal-piece k for the driver's foot. This arm T has its lower end bent under the arm S in such manner as to afford a double stop to limit the extent of swing of the arm T both backward and forward, as shown by the dotted lines in Figs. 2 and 4, in the former of which the pedal-arm is arrested by the stop at its extreme rearward limit of movement and in the latter of which it is arrested by the stop at its extreme forward limit of movement.

Pivoted to the arm T is a rearwardly-extending latch-bar U, with a shoulder upon its rear under side to engage the arm g of the dog Q when the arm T is pressed back by the driver's foot and to draw the dog forward into engagement with the lifting-ratchet when the arm T is pressed forward. It results from this construction that the driver can constantly keep his foot upon the pedal k and by pressing down thereon hold the rake-teeth yieldingly to their work with such degree of pressure as is required, and in order to dump the rake he has only to press the same foot slightly back to engage the latch U with the dog-arm g and then forward to lock the dog, and with it the rake-head, to the lifting-wheel. Still keeping his foot on the pedal, the rake head and teeth are elevated, as seen in Fig. 3, the latch U being lifted from engagement with the dog-arm by a pin l upon the arm T. When the teeth have been lifted sufficiently, the dog-arm g comes in contact with a stop-plate V upon the bar G, and the dog is forced out of engagement with the lifting-ratchet, and the teeth and head are permitted to drop with any degree of swiftness or slowness desired by the regulated pressure of the foot upon the pedal k. Indeed with but slight pressure the driver can, with his foot upon the pedal k, hold the teeth elevated—as, for instance, when he has dumped his last load and wishes to take the rake off the field, or, if he desires, to turn around without raking. In this simple manner the driver at all times has complete control of the rake-head by merely holding his foot upon the pedal k and operating it as above described. The teeth of the ratchet and the engaging-nose of the dog are so shaped that when once engaged they remain so until the stop V effects their disengagement. Upon the resetting of the rake-teeth the end of the latch U rests upon the dog-arm, with the engaging shoulder in front of the same, as seen in Fig. 4.

To provide a hand-dumping attachment, it is only necessary to extend the arm S rearward and upward, as at S', and provide it with a grasping-handle m within easy reach of the driver's hand, who, taking hold of it and lifting it, easily dumps the rake. The stripper-bars W are of metal, preferably steel, and oval in cross-section. Their butts are tapered and threaded at their extremities and are inserted through washers t and through perforations in the bar G and locked by nuts n, screwed upon their rear ends and bearing against the bar G. Fingers v extend down from the washers and engage the under edge of the bar G to prevent the stripper-bars, whose greatest diameter is vertical, from turning.

Having thus fully described our invention, we claim—

1. In a horse-rake, the seat-frame composed of the metal angle draft-bar G, having journal arms N secured thereto, the flat metal brace-bar H, secured to the front side of the bar G and set vertically, and the tubular metal thills J, secured at their rear ends to the bar G and connected to the bar H by clips e, substantially as described.

2. In a horse-rake, the combination, with the rake-teeth and axle A, of the rake-head composed of the flat metal strap-bars b, secured to journaled boxes, the slotted flanged metal bar C, secured to the rear side of the strap-bars, and the tooth-holding metal angle-bar D, secured to the front side of the strap-bars, substantially as described.

3. In a horse-rake, the combination of the metal angle draft-bar G, the metal stripper-bars oval in cross-section, with their larger diameters vertical and having their butts secured to the bar G by means of the washers t, provided with fingers v and the nuts n, substantially as described.

4. In a horse-rake, the combination of a lifting-wheel revolved by the traction of the machine, a tilting rake-head carrying a locking-dog for locking the rake-head to the lifting-wheel, an arm pivoted to the rake-head, a second arm pivoted to the seat-frame and to said first arm, and a pedal-arm for exerting pressure upon said last-named arms and carrying a latch-arm to engage the locking-dog with the lifting-wheel, whereby the driver by the action of his foot upon the pedal-arm can hold the rake down to work, can lock the rake-head to the lifting-wheel to effect the dump, and can regulate the return of the rake-head, substantially as described.

5. In a horse-rake, the combination of a lifting-wheel revolved by the traction of the machine, a tilting rake-head carrying a locking-dog for locking the rake-head to the lifting-wheel, an arm pivoted to the rake-head, a second arm pivoted to the seat-frame and to said first-named arm, a pedal-arm pivoted to said last-named arm and carrying a latch-arm to engage the locking-dog with the lifting-wheel, and a stop to disengage the dog from the lifting-wheel, substantially as described.

6. In a horse-rake, the combination of an axle revolved by the traction of the machine, a lifting-wheel fast on said axle, a tilting rake-head carrying a locking-dog for locking the rake-head to the lifting-wheel, an arm pivoted to the rake-head, a second arm pivoted to the seat-frame and to the said first-named arm, a pedal-arm for exerting pressure on said last-named arms and carrying a latch-arm to engage the locking-dog with the lifting-wheel, and a stop to disengage the dog from the lifting-wheel, substantially as described.

7. In a horse-rake, the combination of the tilting rake-head, the lifting-wheel P, revolved by the traction of the machine, the locking-dog Q, carried by the rake-head, the arm R, pivoted to the rake-head, the arm S, pivoted to the seat-frame and to the arm R, the pedal-arm T, pivoted to the arm S and carrying a latch-arm U for engaging the dog with the lifting-wheel, and the stop V for disengaging the dog from the lifting-wheel, substantially as described.

ARTHUR F. BROWN.
WILLIAM R. KNAUB.

Witnesses:
WARREN HALL,
WM. W. WAGNER.